United States Patent [19]

Boskovic

[11] Patent Number: 5,114,334
[45] Date of Patent: May 19, 1992

[54] SPRING PLUNGER

[76] Inventor: Borislav Boskovic, 2102 Bannockburn, Inverness, Ill. 60067

[21] Appl. No.: 497,741

[22] Filed: Mar. 20, 1990

Related U.S. Application Data

[63] Continuation of Ser. No. 279,449, Dec. 2, 1988, abandoned.

[51] Int. Cl.⁵ .............................................. B29C 45/40
[52] U.S. Cl. .................................... 425/556; 264/335; 425/577; 425/DIG. 127
[58] Field of Search ............... 264/335; 249/66.1, 67, 249/68, 63, 161, 205; 425/534, 556, 563, 567, 577, 450.1, 451, DIG. 127

[56] References Cited

U.S. PATENT DOCUMENTS 3,950,119 4/1976 Reichenbach .................. 425/450.1
4,428,725 1/1984 Babiol ............................ 425/567

OTHER PUBLICATIONS

Polentz, Hydraulic and Pneumatic Power and Control, "Saving Space with the Liquid Spring", 1966, p. 268.

Primary Examiner—Tim Heitbrink
Attorney, Agent, or Firm—Lee, Mann, Smith, McWilliams, Sweeney & Ohlson

[57] ABSTRACT

A spring member for use in a plastic mold for separating and cushioning parts of the mold, and returning ejector assemblies. The spring member is composed of a hollow cylindrical body with a spring-biased plunger extending a short distance from one end. The spring member is shaped to be installed within a bore in a surface in a mold, with only the plunger extending above the mold surface.

12 Claims, 1 Drawing Sheet

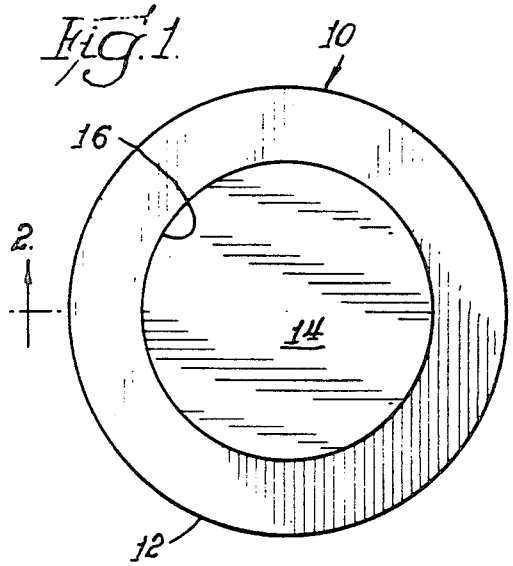
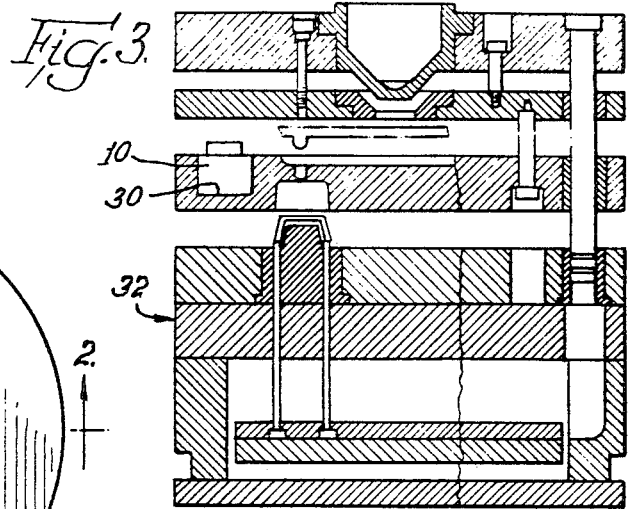
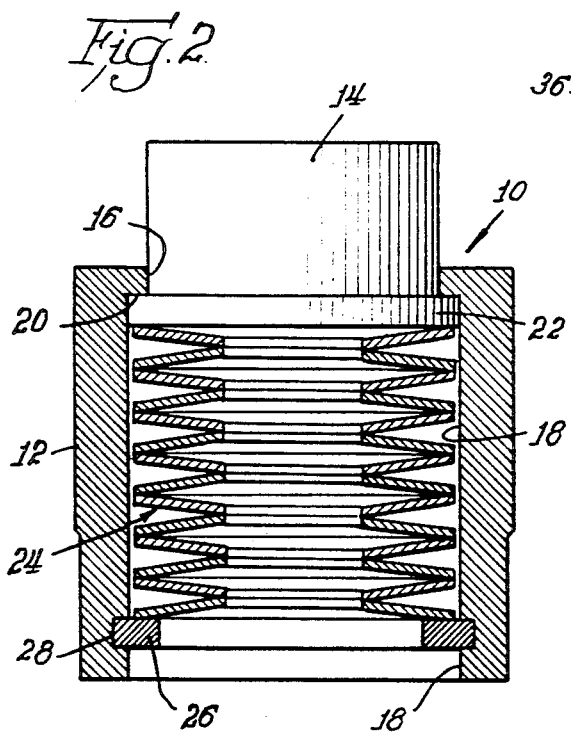
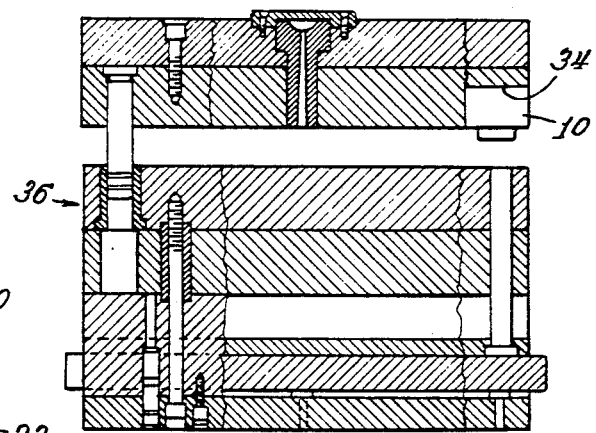
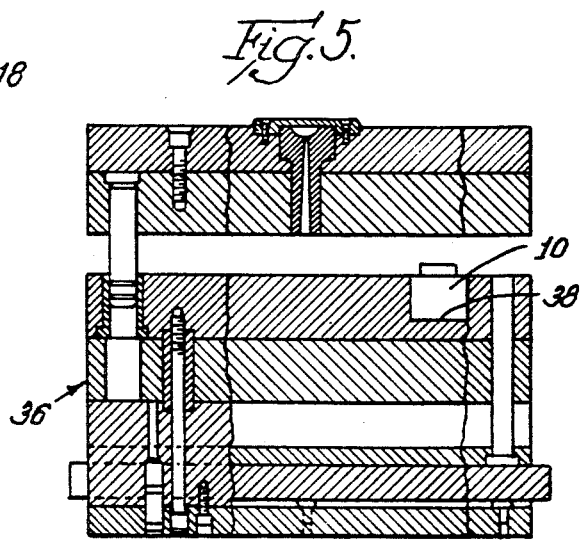

SPRING PLUNGER

This application is a continuation of application Ser. No. 279,449, filed Dec. 2, 1988 now abandoned.

BACKGROUND OF THE INVENTION

This invention relates to plastic molds, and in particular to a spring member for use in a plastic mold for separating and cushioning parts of the mold, and returning ejector assemblies.

Plastic molds, whether of the injection type or otherwise, must be opened after each cycle to allow molded parts to be ejected. Often, mold parts are separated mechanically or hydraulically, with springs being used to aid the molding process, as illustrated, for example, in U.S. Pat. No. 3,950,119. However, springs are susceptible to fouling due to entrained dirt or mold flash. This leads to costly mold downtime while the mold is cleaned or repaired.

SUMMARY OF THE INVENTION

The invention is directed to a spring member for use in a plastic mold for separating and cushioning parts of the mold. The spring member has a cylindrical body having a circular opening at one end. An internal cylindrical bore extends axially in the body, the bore joining and extending from the circular opening and having a diameter greater than the diameter of the opening, forming an internal annular shoulder in the body at the junction of the opening and the bore. A cylindrical plunger extends from the body through the opening. The plunger has a collar disposed within the bore which bears against the shoulder during normal use. Means is located within the bore bearing against the plunger and resiliently urging the plunger through the opening.

In accordance with the disclosed embodiment of the invention, the collar is a continuous annular collar having an outer diameter substantially equal to the diameter of the bore. Thus, the plunger is permanently retained within the bore in the body.

Preferably, the means bearing against the plunger comprises a spring. The spring, in order to provide the greatest strength and life, is a Belleville spring. Also since the bore preferably extends through the body, provided is a retainer ring seated within an annular groove formed in the bore, with the spring being located between the retaining ring and the plunger.

BRIEF DESCRIPTION OF THE DRAWING

The invention is described in greater detail in the following description of an example embodying the best mode of the invention, taken in conjunction with the drawing figures, in which FIG. 1 is a top plan view of a spring plunger according to the invention, FIG. 2 is a cross-sectional view taken along lines 2—2 of FIG. 1, showing the spring for the plunger and its means of retention within the body thereof, and with the plunger in full elevation rather than cross section in order to better depict detail, FIG. 3 shows a spring plunger according to the invention when installed within a plastic injection mold for separating parting lines, FIG. 4 shows a spring plunger according to the invention when installed within a plastic injection mold to return ejector assemblies, and FIG. 5 shows a spring plunger according to the invention when installed within a plastic injection mold to cushion parting lines.

DESCRIPTION OF AN EXAMPLE EMBODYING THE BEST MODE OF THE INVENTION

A spring plunger according to the invention is shown generally at 10 in the drawing figures. It is composed of two basic parts, a cylindrical body 12 and a cylindrical plunger 14 extending from a circular opening 16 at one end of the body 12.

The plunger 14 is installed within an axial bore 18 extending through the opposite end of the body 12. As illustrated, the bore 18 is of a greater diameter than the opening 16, forming an internal annular shoulder 20 in the body 12 at the junction of the opening 16 and the bore 18.

The plunger 14 includes an integral collar 22 disposed within the bore 18 and bearing against the shoulder 20. The collar 22 preferably is a continuous annular collar having an outer diameter which is substantially equal to the inner diameter of the bore 18. Obviously, to permit free movement of the plunger 14, the diameter of the collar 22 is slightly less than that of the bore 18.

A spring 24 is installed within the bore 18 to urge the plunger 14 through the opening 16. The spring 24 preferably, and as illustrated, comprises a Belleville spring which is composed of a series of disk-like spring elements bearing against the plunger 14 and extending between the plunger 14 and a retainer ring 26 which is lodged within an annular groove 28 formed in the bore 18. Alternatively, the ring 28 can be replaced by a cap at the end of the body 12 to accomplish the same purpose. The disk-type Belleville spring 24 provides constant pressure, often far superior to the non-linear pressure of a conventional coil spring.

For strength and durability, all parts of the spring plunger 10 are steel. The body 12 and plunger 14 maybe formed of hardened stainless steel to avoid corrosion. Tolerances between the plunger 14 and the opening 16 are maintained as close as practical to prevent inward migration of dirt, mold flash, and the like.

FIG. 3 illustrates utilization of a spring plunger 10 according to the invention when installed in a bore 30 of a plastic injection mold 32. The purpose of the installation of the spring plunger 10 as illustrated is to separate parting lines in sequence. Since the mold 32 is intended to be any conventional mold structure, description of the mold is omitted, as is description of the molds of FIGS. 4 and 5.

FIG. 4 illustrates a spring plunger 10 according to the invention when installed within a bore 34 in a plastic injection mold 36. The purpose of the installation of the spring plunger 10 is to return an ejector assembly in alignment with the spring plunger 10.

FIG. 5 illustrates installation of a spring plunger 10 according to the invention in a bore 38 in the mold 36, in this instance to cushion parting lines of the mold 36 as the mold is closed.

The spring plunger 10 according to the invention therefore has a wide diversity of possible usages within an injection molding apparatus. The plunger is self-contained and non-fouling. Various changes can be made to the invention without departing from the spirit thereof or scope of the following claims.

What is claimed is:

1. A spring member for use in a plastic mold for separating and cushioning parts of the mold, said spring member being located in a bore in one part of the mold in contacting alignment with a second part of the mold which is movable relative to the first part and comprising a. a cylindrical body having a circular opening at one end,
   b. an internal cylindrical bore in said body, said bore joining and extending from said opening and having a diameter greater than the diameter of said opening, forming an internal annular shoulder in said body at the junction of said opening and said bore,
   c. a cylindrical plunger extending from said body through said opening, said plunger having a length less than the length of said internal bore and having a collar disposed within said bore and bearing against said shoulder, said collar being located at one end of said plunger,
   d. retaining means for retaining elements of the spring member within said bore, said retaining means being lodged in said bore and spaced from said one end, and
   e. means in said bore extending between said retaining means and said one end and bearing against said one end of said plunger to resiliently urge said plunger through said opening.

2. A spring member according to claim 1, in which said collar is a continuos annular collar having an outer diameter substantially equal to the diameter of said bore.

3. A spring member according to claim 1, in which said means bearing against said plunger comprises a spring.

4. A spring member according to claim 3, in which said spring is a Belleville spring.

5. A spring member according to claim 1, in which said bore extends through the other end of said body.

6. A spring member according to claim 5, in which said means bearing against said plunger comprises a spring.

7. A spring member according to claim 6, in which said retaining means comprises a retainer ring seated within an annular groove formed in said bore, said spring being located between said retainer ring and said plunger.

8. A spring member according to claim 7, in which said spring is a Belleville spring.

9. A spring member according to claim 6, in which said spring is a Belleville spring.

10. A spring member for use in supplying spring force in a plastic injection mold, said spring member being located in a bore in one part of the mold in contacting alignment with a second part of the mold which is movable relative to the first part and comprising a. a cylindrical body having a circular opening at one end,
   b. an internal cylindrical bore in said body, said bore joining and extending from said opening and having a diameter greater than the diameter of said opening, forming an internal annular shoulder in said body at the junction of said opening and said bore,
   c. a cylindrical plunger extending from said body through said opening, said plunger having a length less than the length of said internal bore and having a collar disposed within said bore and bearing against said shoulder, said collar being located at one end of said plunger,
   d. retaining means for retaining elements of the spring member within said bore, said retaining means being lodged in said bore and spaced from said one end, and
   e. a spring located in said bore extending between said retaining means and said one end and bearing against said one end of said plunger to resiliently urge said plunger through said opening.

11. A spring member according to claim 10, in which said bore extends through the other end of said body.

12. A spring member according to claim 11, in which said retaining means comprises a retainer ring seated within an annular groove formed in said bore, said spring being located between said retainer ring and said plunger.

* * * * *